(12) United States Patent
Sulser et al.

(10) Patent No.: US 8,474,869 B2
(45) Date of Patent: Jul. 2, 2013

(54) STEERING COLUMN FOR A MOTOR VEHICLE

(75) Inventors: Hansjörg Sulser, Gamprin (LI); Sebastian Huber, Götzis (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 13/515,956

(22) PCT Filed: Nov. 5, 2010

(86) PCT No.: PCT/AT2010/000420
§ 371 (c)(1),
(2), (4) Date: Jun. 14, 2012

(87) PCT Pub. No.: WO2011/072311
PCT Pub. Date: Jun. 23, 2011

(65) Prior Publication Data
US 2012/0266716 A1    Oct. 25, 2012

(30) Foreign Application Priority Data

Dec. 16, 2009 (DE) .......................... 10 2009 059 159

(51) Int. Cl.
*B62D 1/19* (2006.01)
(52) U.S. Cl.
USPC .............................. 280/777; 74/493; 280/775
(58) Field of Classification Search
USPC ...................................... 280/777, 775; 74/493
See application file for complete search history.

(56) References Cited

U.S. PATENT DOCUMENTS

| 5,082,311 A | 1/1992 | Melotik |
| 5,286,056 A | 2/1994 | Speich |

(Continued)

FOREIGN PATENT DOCUMENTS

| DE | 28 21 707 | 11/1978 |
| DE | 41 38 239 | 5/1993 |

(Continued)

OTHER PUBLICATIONS

International Search Report issued Mar. 18, 2010 in International (PCT) Application No. PCT/AT2009/000264.

(Continued)

*Primary Examiner* — Ruth Ilan
(74) *Attorney, Agent, or Firm* — Wenderoth, Lind & Ponack, L.L.P.

(57) ABSTRACT

A steering column for a motor vehicle includes a casing unit, which rotatably supports a steering shaft about the longitudinal axis thereof, and a retaining part. The casing unit is held in a fixed manner relative to said retaining part up to a threshold value of a force acting on the casing unit in a parallel manner to the longitudinal axis of the steering shaft in the direction of the front of the vehicle. When the threshold value is exceeded, the casing unit is movably held in a parallel manner to the longitudinal axis in the direction of the front of the vehicle. The casing unit is connected to the retaining part via an energy-absorbing connection, which a bending wire or strip that is deformed when the casing unit is moved relative to the retaining part parallel to the longitudinal axis in the direction of the front of the vehicle, and via a breakaway connection closed up to a threshold value of the force and blocks a movement of the casing unit relative to the retaining part and which opens when the threshold value of the force is exceeded.

12 Claims, 6 Drawing Sheets

U.S. PATENT DOCUMENTS

| | | | |
|---|---|---|---|
| 5,517,877 A | | 5/1996 | Hancock |
| 5,562,307 A | * | 10/1996 | Connor .................. 280/777 |
| 5,722,299 A | | 3/1998 | Yamamoto et al. |
| 5,820,163 A | | 10/1998 | Thacker et al. |
| 5,961,146 A | * | 10/1999 | Matsumoto et al. .......... 280/777 |
| 5,988,679 A | | 11/1999 | Schelling et al. |
| 6,095,012 A | | 8/2000 | Lutz |
| 6,183,012 B1 | * | 2/2001 | Dufour et al. .................. 280/777 |
| 6,264,240 B1 | | 7/2001 | Hancock |
| 6,419,269 B1 | | 7/2002 | Manwaring et al. |
| 6,616,185 B2 | | 9/2003 | Manwaring et al. |
| 6,792,824 B2 | | 9/2004 | Jolley et al. |
| 6,848,716 B2 | | 2/2005 | Lutz |
| 7,350,815 B2 | | 4/2008 | Spano et al. |
| 7,484,430 B2 | | 2/2009 | Schulz |
| 7,607,696 B2 | | 10/2009 | Graf |
| 7,963,561 B2 | | 6/2011 | Waibel et al. |
| 8,047,096 B2 | | 11/2011 | Ridgway et al. |
| 2003/0057694 A1 | | 3/2003 | Manwaring et al. |
| 2004/0012185 A1 | | 1/2004 | Lutz |
| 2004/0100084 A1 | * | 5/2004 | Munro et al. ................. 280/777 |
| 2004/0155448 A1 | | 8/2004 | Klukowski et al. |
| 2006/0043720 A1 | * | 3/2006 | Sawada et al. ................ 280/775 |
| 2006/0181070 A1 | * | 8/2006 | Imamura et al. ............. 280/777 |
| 2006/0207379 A1 | | 9/2006 | Riefe et al. |
| 2006/0273568 A1 | | 12/2006 | Manwaring et al. |
| 2007/0194563 A1 | * | 8/2007 | Menjak et al. ................. 280/777 |
| 2007/0253372 A1 | * | 11/2007 | Nakayasu ..................... 370/331 |
| 2008/0217901 A1 | | 9/2008 | Olgren et al. |
| 2008/0229867 A1 | | 9/2008 | Waibel et al. |
| 2009/0013817 A1 | | 1/2009 | Schnitzer et al. |
| 2009/0020996 A1 | * | 1/2009 | Geibel et al. ................. 280/777 |
| 2010/0032933 A1 | * | 2/2010 | Cymbal et al. ................ 280/777 |
| 2011/0115206 A1 | | 5/2011 | Sulser et al. |
| 2012/0024101 A1 | | 2/2012 | Schnitzer et al. |

FOREIGN PATENT DOCUMENTS

| | | |
|---|---|---|
| DE | 693 04 659 | 3/1997 |
| DE | 10 2005 052 123 | 1/2007 |
| EP | 0 641 705 | 3/1995 |
| EP | 0 598 857 | 9/1996 |
| EP | 0 802 104 | 10/1997 |
| EP | 0 836 981 | 4/1998 |
| EP | 0 849 141 | 6/1998 |
| EP | 1 093 990 | 4/2001 |
| EP | 1 125 820 | 8/2001 |
| EP | 1 382 509 | 1/2004 |
| EP | 1 433 687 | 6/2004 |
| EP | 1 464 560 | 10/2004 |
| EP | 1 705 098 | 9/2006 |
| EP | 1 967 442 | 9/2008 |
| EP | 2 296 956 | 3/2011 |
| FR | 2 872 474 | 1/2006 |
| FR | 2 881 707 | 8/2006 |
| FR | 2 932 143 | 12/2009 |
| GB | 1 584 984 | 2/1981 |
| GB | 2 268 125 | 1/1994 |
| GB | 2 309 204 | 7/1997 |
| GB | 2 344 078 | 5/2000 |
| GB | 20 2008 015 444 | 3/2009 |
| GB | 10 2008 034 807 | 10/2009 |
| GB | 10 2008 016 742 | 11/2009 |
| WO | 2007/048153 | 5/2007 |
| WO | 2009/121386 | 10/2009 |
| WO | 2009/147325 | 10/2009 |
| WO | 2010/009486 | 1/2010 |

OTHER PUBLICATIONS

"Strip" Definition, Merriam-Webster Online Dictionary, available at http://www.merriam-webster-com/dictionary/strip (last visited Apr. 30, 2012).

"Deform" Definition, Merriam-Webster Online Dictionary, available at http://www.merriam-webster.com/dictionary/deform (last visited Apr. 30, 2012).

"Shank" Definition, Merriam-Webster Online Dictionary, available at http://www.merriam-webster.com/dictionary/shank (last visited Apr. 30, 2012).

"Cooperate" Definition, Merriam-Webster Online Dictionary, available at http://www.merriam-webster.com/dictionary/cooperate (last visited May 1, 2012).

German Office Action dated Nov. 3, 2011 in German Patent Application No. 09 775 553.2-2425.

International Search Report issued Mar. 15, 2011 in International (PCT) Application No. PCT/AT2010/000420.

* cited by examiner

STEERING COLUMN FOR A MOTOR VEHICLE

BACKGROUND OF THE INVENTION

The invention relates to a steering column for a motor vehicle, which comprises a jacket unit supporting a steering shaft rotatably about its longitudinal axis and a retaining part, which the jacket unit is secured non displaceably up to a limit value of a force acting onto the jacket unit parallel to the longitudinal axis of the steering shaft in the direction toward the front of the motor vehicle. If the limit value is exceeded, the jacket unit is displaceable parallel to the longitudinal axis in the direction toward the motor vehicle front. The jacket unit is connected with the retaining part, for one, across an energy absorption connection, which comprises at least one bending wire or strip that, upon a displacement of the jacket unit with respect to the retaining part parallel to the longitudinal direction toward the motor vehicle front, is deformed, and is connected, for another, across a break-away connection which, up to the limit value of the force, is closed and blocks a displacement of the jacket unit with respect to the retaining part and which is released if the limit value of the force is exceeded. The invention further relates to a method for the production of such a steering column.

Steering columns for motor vehicles are most often implemented such that they are adjustable so that the position of the steering wheel can be adapted to the seating position of the driver. Such adjustable steering columns are known in various embodiment forms. Apart from adjustable steering columns which are only adjustable in the length or height or inclination direction, steering columns are also known which are adjustable in the length as well as also the height or inclination direction.

As a safety measure in the event of a vehicle crash, it is known and conventional to realize in steering columns for motor vehicles the steering shaft together with a jacket unit, rotatably supporting the steering shaft, in a section adjoining the steering wheel-side end such that it is displaceable in the longitudinal direction of the steering column (=parallel to the longitudinal axis of the steering shaft) with the absorption of energy. A conventional implementation form provides for this purpose that a bracket unit, with respect to which in the opened state of the clamping mechanism the jacket unit is displaceable for setting the position of the steering column, is so connected with a mounting part attached on the vehicle chassis that the jacket unit with the absorption of energy is dislocatable with respect to the mounting part. Such a construction is shown, for example, in U.S. Pat. No. 5,517,877 A.

DE 28 21 707 A1 discloses a non-adjustable steering column in which the jacket tube rotatably supporting the steering shaft includes bilaterally projecting fins which had been connected on the chassis by securement blocks and bolts penetrating therethrough. In the event of a crash, the fins can become detached from the securement blocks, whereby a dislocation of the jacket tube is enabled. Between the securement blocks and the fins, U-shaped bending strips are herein provided on which deformation work is carried out during the dislocation of the jacket tube. The bending strips are enclosed in chambers of the fins and are in contact on opposing side walls of the chambers such that the rolling radius of the particular bending strip during its deformation is limited and predetermined.

An adjustable steering column comprising a jacket unit rotatably supporting the steering shaft and a bracket unit, with respect to which the jacket unit in the opened state of a securement device is displaceable for setting the position of the steering column at least in the longitudinal direction of the steering column, is disclosed in EP 0 598 857 B1. In the event of a crash, the jacket unit can be dislocated with respect to the bracket unit or with respect to a clamp bolt of the securement device in the longitudinal direction of the steering column. For the energy absorption, bending strips or bending wires are provided that are entrained with the jacket unit and placed about the clamp bolt, which strips or wires are deformed. One disadvantage of this solution is that the possible displacement path or the characteristic of the energy absorption in this device depends on the particular positioning length of the steering column.

Further, U.S. Pat. No. 5,961,146 A describes a steering column which in normal operation is only adjustable in the height direction. In a manner similar to that described above, a bending wire is provided curved in the shape of a U about the clamp bolt of the securement device, which in the event of a crash is entrained by the jacket unit dislocating with respect to the clamp bolt in the longitudinal direction of the steering column, whereby bending work is performed.

In the steering column disclosed in WO 2007/048153 A2, in the closed state of the securement device a retaining part is prevented by a securement part of the securement device from being displaced with respect to this securement part referred to the direction parallel to the steering shaft. The jacket unit can become dislocated in the longitudinal direction of the steering column with respect to the retaining part with the absorption of energy. For the energy absorption, a bolt is disposed on the retaining part which projects into an elongated hole of an energy absorption part disposed on the jacket unit and which, during its shift in the event of a crash, widens this elongated hole. To attain defined energy absorption, the material properties of the energy absorption part in the proximity of the elongated hole must be precisely defined such that they are reproducible.

Similar steering columns are also disclosed in EP 0 849 141 A1 and EP 1 464 560 A2. The retaining parts are guided by guide parts in the manner of a carriage such that they are displaceable in the longitudinal direction of the steering column. They are held under frictional closure with respect to the guide parts or plastically deform them with the consumption of energy. In the case of a frictionally engaged mounting, the clamping force of the securement device must be taken into account when considering the magnitude of the energy absorption. In a plastic deformation of the guide parts, their material properties must be implemented in a precisely defined reproducible manner.

A steering column of the above type is disclosed in DE 10 2008 034 807 B3. The retaining part is connected with the jacket unit, for one, across a bending wire or strip and, for another, across a pin forming a break-away connection between the retaining part and the jacket unit. If, in the event of a crash, a force, acting onto the steering wheel-side end of the steering shaft parallel to the longitudinal axis of the steering shaft in the direction towards the vehicle front, exceeds a limit value, the pin is shorn off and the break-away connection is consequently released. The jacket unit can then become dislocated with respect to the retaining part parallel to the longitudinal axis of the steering shaft in the direction toward the vehicle front, wherein the bending wire or strip is deformed and thereby energy is absorbed. The retaining part is herein hindered from being displaced in the direction parallel to the longitudinal axis of the steering shaft through its engagement with its securement part of the securement device. In the opened state of the securement device, the securement part is raised from the retaining part and the jacket unit, together with the retaining part, can be displaced parallel to the longitudinal axis of the steering shaft in order to carry out a length positioning of the steering column. Further, in the opened state of the securement device, a height or inclination adjustment of the steering column is feasible.

One disadvantage in this prior known steering column includes that during the opening of the break-away connection a force peak (=break-away peak) occurs, e.g. the limit value of the force acting parallel to the longitudinal axis of the steering shaft, starting at which the break-away connection is released and an energy absorbing displacement of the jacket unit with respect to the retaining part sets in, is relatively high. After the break-away connection has been released, the force counteracting a displacement of the jacket unit with respect to the retaining part is less.

SUMMARY OF THE INVENTION

The invention addresses the problem of at least decreasing this force peak (=break-away peak), and to do so in a simple and cost-effective yet functionally advantageous implementation.

This is attained according to the invention through a steering column with the features described below or, respectively, through a method for the production of a steering column with the features described below. Advantageous further developments are described in the dependent claims.

In the steering column of the invention an elastic prestress is exerted onto the at least one bending wire or strip. The jacket unit is thereby prestressed with respect to the retaining part in the displacement direction parallel to the longitudinal axis of the steering shaft in the direction toward the vehicle front. This prestress acts on the break-away connection between the jacket unit and the retaining part. The force required in the event of a crash to release the break-away connection is thereby decreased since the elastic reset force of the at least one bending wire or strip is added to the force exerted, in particular through the secondary collision of the driver with the steering wheel, parallel to the longitudinal axis of the steering shaft in the direction toward the vehicle front. The force peak during the breaking away of the jacket unit from the retaining part (=break-away peak) can thereby be decreased or entirely avoided. Nevertheless, in normal driving operation (thus when no vehicle crash occurs), an adequately stable connection is provided between the retaining part and the jacket unit, through which a shaking between the jacket unit and the retaining part and vibrations through intrinsic resonances can be avoided, and this can be achieved with a very simple implementation.

The steering column is preferably implemented such that it is adjustable in length. An openable and closable securement device is herein provided, in the opened state of which the jacket unit is displaceable with respect to a bracket unit supporting the jacket unit parallel to the longitudinal axis of the steering shaft and which, in its closed state, applies a securement force for the securement of the jacket unit with respect to the bracket unit against a displacement parallel to the longitudinal axis of the steering shaft. In the mounted state of the steering column the bracket unit is herein firmly secured on the vehicle, at least in normal operation, thus without a crash having occurred, e.g. up to a maximum force acting in the direction of the longitudinal axis of the steering shaft.

An advantageous embodiment of the invention provides that the retaining part is formed by a part of the securement device. The retaining part in the closed state of the securement device is herein in engagement with a securement part which is secured in position with respect to the bracket unit such that it is nondisplaceable in the direction of the longitudinal axis of the steering shaft. Through this engagement between the securement part and the retaining part, at least a portion of the securement force is applied securing, in the closed state of the securement device, the jacket unit against a displacement parallel to the longitudinal axis of the steering shaft. In the opened state of the securement device, the retaining part and the securement part are out of engagement. However, the energy absorption device for enabling the energy absorbing dislocation of the jacket unit in the event of a crash is integrated into the securement device. In this embodiment of the invention, the vehicle-stationary mounting of the bracket unit can be provided. A further energy absorbing dislocateability between the bracket unit and a mounting part, displaceably supporting this bracket unit parallel to the longitudinal axis of the steering shaft and mounted stationarily on the vehicle, can consequently be omitted.

Since in this embodiment of the invention the securement part, referred to in the direction of the longitudinal axis of the steering shaft, is nondisplaceable with respect to the bracket unit. The retaining part, during the displacement of the jacket unit with respect to the bracket unit, in the opened state of the securement device moves simultaneously with the jacket unit. The securement part and the retaining part thus come in different length settings of the steering column in different positions into mutual contact when the securement device is closed. In the closed state of the securement device, the displacement of the retaining part with respect to the securement part (in the direction parallel to the longitudinal axis of the steering shaft) is counteracted by securement elements cooperating, preferably under form closure, advantageously through cooperating toothings. The securement of the jacket unit in the closed state of the securement device against a displacement in the length displacement direction, consequently, takes place at least also via the cooperation of the securement part with the retaining part. Additionally, for example, securement elements acting under frictional closure can be provided for the securement of the jacket unit against a displacement in the length displacement direction in the closed state of the securement device.

The height or inclination of the steering column is especially preferably also settable in the opened state of the securement device.

In the event of a crash, after the break-away connection has been released during the dislocation of the jacket unit with respect to the retaining part (which is held nondisplaceably with respect to the securement unit in the direction parallel to the longitudinal axis of the steering shaft), at least a section of the at least one bending wire or strip is entrained by the jacket unit. The deformation of the bending wire or strip takes place by the bending of the bending wire or strip or comprises at least one such. The bending wire or strip preferably comprises two legs connected via a recurvature, wherein the two legs form an angle in particular in the range of 150° to 220°, preferably an angle of 180°, such that a U-shaped development of the bending wire or strip results.

An advantageous development provides that the bending wire or strip is at least partially enclosed in a housing which preferably is formed by a portion of the jacket unit. For this purpose, a rail U-shaped in cross section is secured in position on a jacket tube rotatably supporting the steering shaft. A development of the housing or a portion thereof on the, respectively of the, bracket unit is also conceivable and feasible.

The break-away connection between the retaining part and the jacket unit can be formed, for example, by a pin connecting these two parts, which, in the event of a crash, is sheared off if the limit value of the force acting upon the steering shaft and thereover onto the jacket unit parallel to the longitudinal axis of the steering shaft in the direction toward the vehicle front is exceeded. Other types of form closure connections, which, in the event of a crash, are released through material reforming, material shearing or fracture, are also conceivable and feasible. A break-away connection can, for example, also be attained through a frictional closure connection which, if the limit value of the force is exceeded, enables a dislocation of the jacket unit with respect to the retaining part and only acts over a small first segment of the displacement path. Consequently, as a break-away connection any connection between the jacket unit and the retaining part should be considered which, after a displacement over a short displacement path between the jacket and the retaining part (parallel to the longitudinal axis), which is preferably less than two centimeters, counteracts a further displacement between the jacket unit and the retaining part with no force or only a significantly lower than initial force, preferably less than one tenth of the initial force.

Accordingly, a solder connection or welded connection or adhesive connection is suitable as the break-away connection if it is laid out such that it is released when the desired force is exceeded.

BRIEF DESCRIPTION OF THE DRAWINGS

Further advantages and details of the invention will be explained in the following in conjunction with the enclosed drawings, in which.

DETAILED DESCRIPTION OF THE INVENTION

Figure 1:
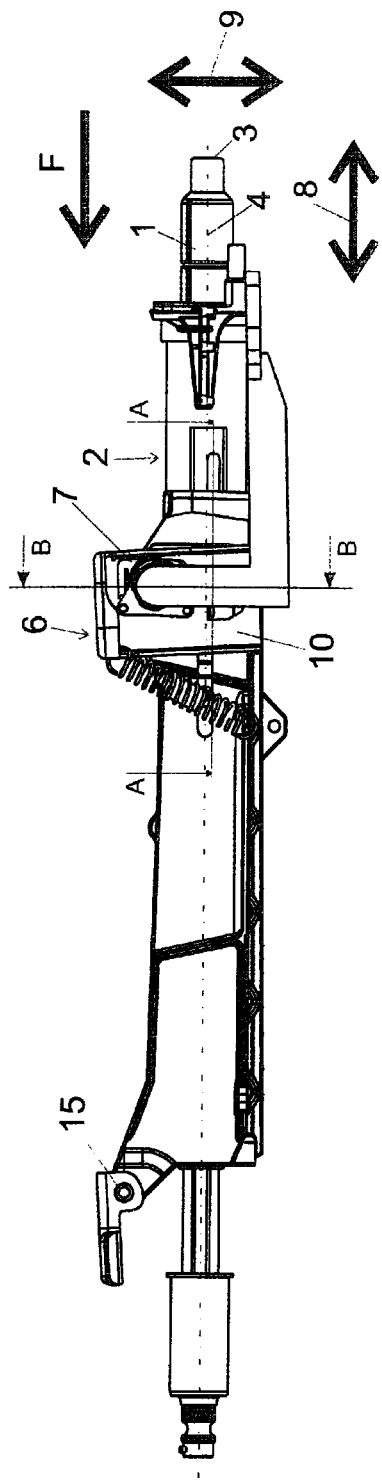
FIG. 1 is a side view of a steering column according to a first embodiment of the invention.
Figure 2:
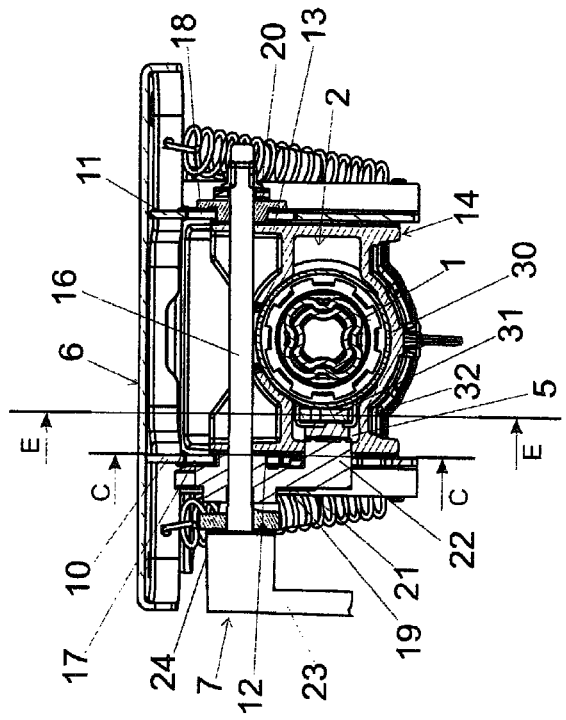
FIG. 2 is a section view along line BB of FIG. 1.
Figure 3:
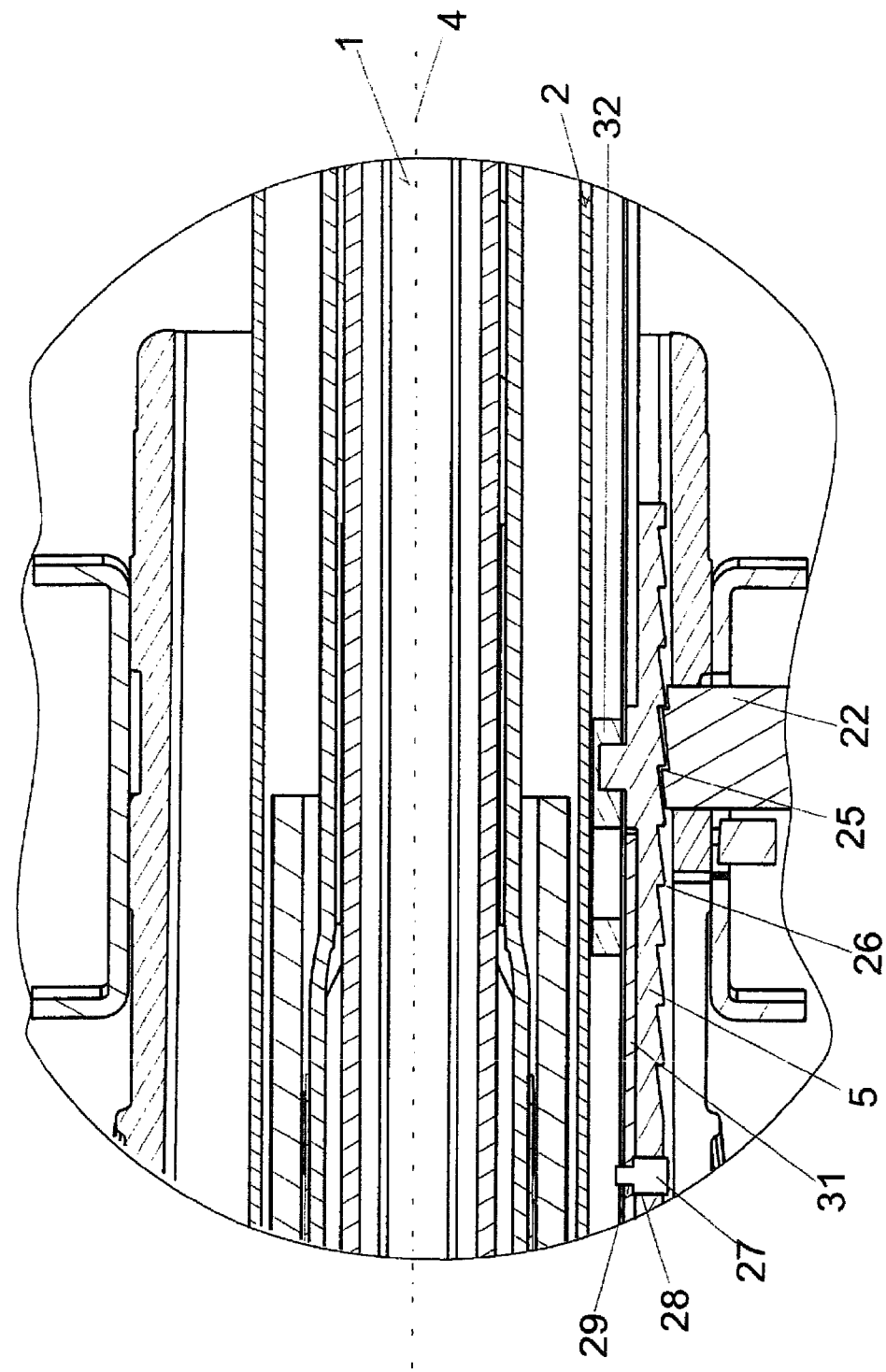
FIG. 3 is a section view along line AA of FIG. 1.
Figure 4:
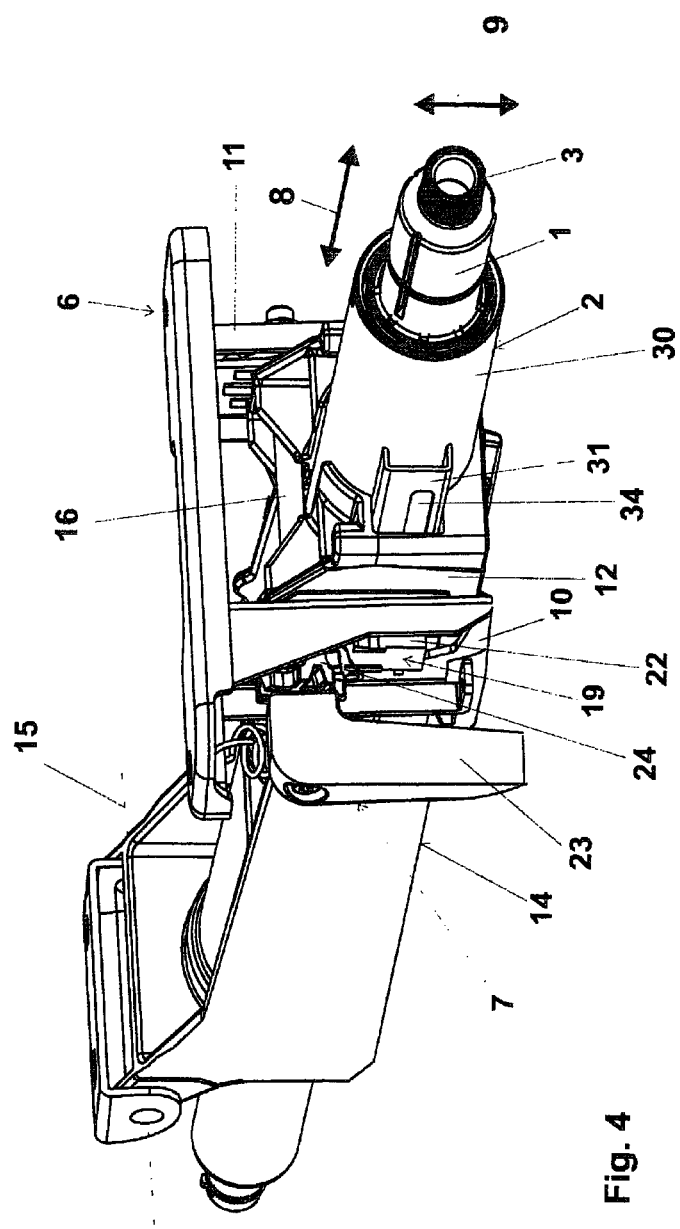
FIG. 4 is an oblique view of the steering column of FIG. 1.
Figure 5:
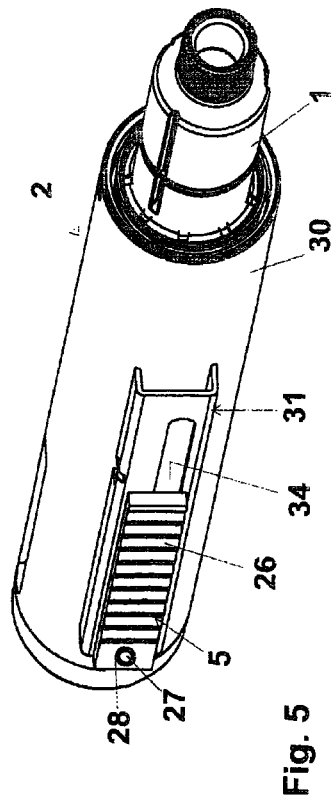
FIG. 5 is an oblique view of the jacket unit, of the section of the steering shaft rotatably supported thereby and the retaining part.
Figure 6:
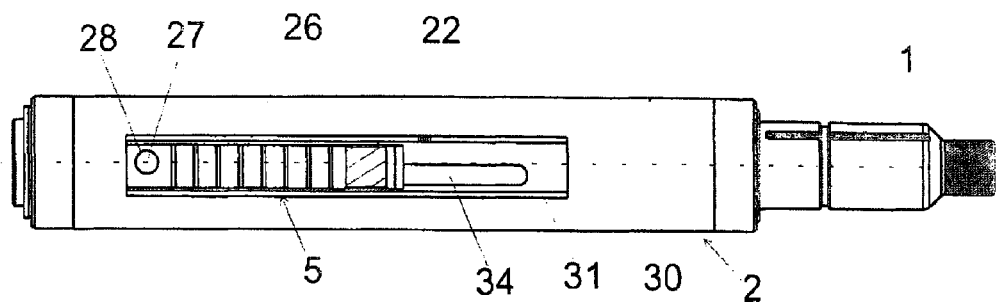
FIG. 6 is a section view corresponding to line CC of FIG. 2, wherein, however, are omitted the bracket unit, the intermediate unit and the securement device, apart from the securement part in engagement with the retaining part (shown in section)

A first embodiment of the invention is depicted in FIGS. 1 to 8. The steering column comprises a jacket unit 2 which bearing supports a steering shaft 1 rotatably about the longitudinal axis 4 of the steering shaft 1, which comprises a steering wheel-side end 3 serving for the connection of a steering wheel, not shown in the Figures. The jacket unit 2 is connected with a retaining part 5 across a break-away connection and energy absorption connection, which will be more precisely described later. Up to a limit value of a force acting between the jacket unit and the retaining part 5 parallel to the longitudinal axis 4, the retaining part 5 is connected with the jacket unit 2 such that it is nondisplaceable relative to the direction of the longitudinal axis 4. The limit value can herein be identical or different for the two directions parallel to the longitudinal axis 4 and be set during the construction of the system.

A force F (or the corresponding force component parallel to the longitudinal axis 4), exerted in the event of a crash through the secondary collision of the driver onto the jacket unit 2, is directed toward the vehicle front, as is illustrated in FIG. 1, and accordingly is absorbed through a counter-force on the bracket unit 6.

A bracket unit 6 supporting the jacket unit 2 in the operating state of the steering column is rigidly connected with the chassis of the motor vehicle. In the opened state of a securement device 7 the steering column can be adjusted in length and in height or inclination. The jacket unit 2 is herein displaceable with respect to the bracket unit 6 parallel to the longitudinal axis 4 (=length adjustment direction 8) and into a height or inclination adjustment direction 9, at right angles thereto, with respect to the bracket unit 6. In the closed state of the securement device 7 a securement force, for the securement of the jacket unit 2 relative to a displacement taking place parallel to the longitudinal axis 4 with respect to the bracket unit 6, is applied, wherein the securement force is, at least relative to a displacement parallel to the longitudinal axis 4 in the direction toward the vehicle front, higher than the limit value of the force up to which the jacket unit 2 is held nondisplaceably with respect to the retaining part 5. Further, by the securement device 7, a securement force for the securement of the jacket unit 2 is applied against a displacement with respect to the bracket unit 6 in the height or inclination adjustment direction 9.

In the depicted embodiment, the jacket unit 2 is located between side jaws 10, 11 of the bracket unit 6. Between the side jaws 10, 11 of the bracket unit 6 and the jacket unit 2 are located side flanks 12, 13 of an intermediate unit 14 which encompasses the jacket unit 2 at least over a large portion of its circumference. In the opened state of the securement device 7 the intermediate unit 14 is displaceable with respect to the bracket unit 6 in the height or inclination adjustment direction 9. For this purpose, it is swivellable about a swivel axis 15 with respect to the bracket unit 6. The intermediate unit 14 is connected with the bracket unit 6 nondisplaceably, relative to the direction of the longitudinal axis 4, for example (also) via the development of this swivel axis 15. The jacket unit 2 in the opened state of the securement device 7 is displaceable with respect to the intermediate unit 14, displaceably guiding the jacket unit 2, parallel to the longitudinal axis 4 and, in the closed state of the securement device 7, is held nondisplaceably with respect to the intermediate unit 14 through the securement force applied by the securement device 7 in the direction of the longitudinal axis 4.

The securement device 7 comprises a clamp bolt 16 extending at right angles to the longitudinal axis 4 which penetrates through openings 17, 18 (cf. FIG. 2) in the side jaws 10, 11, which are implemented as elongated holes extending in the direction of the height or inclination adjustment 9 and in which the clamp bolt 16 shifts during the height or inclination adjustment of the steering column. The clamp bolt 16 is held by the margins of these openings 17, 18 nondisplaceably, relative to the direction of the longitudinal axis 4, with respect to the bracket unit 6. The clamp bolt 16, further, penetrates openings in the side flanks 12, 13 of the intermediate unit 11 whose diameter, apart from a sliding clearance, correspond to that of the clamp bolt 16.

On the clamp bolt 16 securement parts 19, 20 are disposed on both sides of the side jaws 10, 11 of bracket unit 6, through which parts penetrates the clamp bolt 16 through openings and which are axially displaceable in the direction of the axis of the clamp bolt 16. The one securement part 19 includes a section in which it is penetrated by clamp bolt 16 and a section 22 connected therewith across a connection section 21, in which section 22 the part 19 cooperates, as will be described below, with the retaining part 5. The securement part 20 and the securement part 19, in the proximity of its section penetrated by clamp bolt 16, in the closed state of the securement device are pressed onto the side jaws 10, 11 of the bracket unit 6 in order to secure in position the adjustment of the steering column in the height or inclination adjustment direction. This securement in position can take place through frictional closure. Elements cooperating under form closure, for example toothings, can also be provided.

For tightening the securement parts 19, 20 with the side jaws 10, 11 and securement part 19 with the retaining part 5, the securement device 7 can be implemented in the conventional manner. For example, a clamping lever 23 serving for opening and closing the securement device 7 is connected with a cam disk 24, which it entrains upon a turning about the axis of the clamp bolt 16 and which cooperates with a link disk. The link disk is here implemented as integral with the securement part 19, but a separate link disk could also be provided. Configurations with rolling bodies or other implementations of clamping mechanisms are also applicable.

The section 22 of the securement part 19 penetrates an opening in the side jaw 10 (the side jaw 10 could also terminate above the section 22 of the securement part 19) and an opening in side flank 12 of the intermediate unit 14. In the closed state of the securement device, section 22 is pressed with a toothing 25 disposed thereon onto a toothing 26 of the retaining part 5. Depending on the length positioning of the steering column, the toothings 25, 26 come into mutual contact in different positions.

Section 22 of securement part 19, which in its entirety is located on one side of clamp bolt 16, is held nondisplaceably against a shift with respect to the bracket unit 6 in a direction parallel to the longitudinal axis 4 by the margins of the penetrated opening in side jaw 10 and/or by the margins of the penetrated opening in side flank 12 of the intermediate unit 14.

Through the cooperating toothings 25, 26 the retaining part 5 in the closed state of the securement device 7 is secured in position against a displacement with respect to securement part 19 in the direction of the longitudinal axis 4. If, during the closing of the securement device 7, these two toothings come into mutual contact in a tooth-on-tooth position, at least after a minimal initial shift (which is less than the tooth spacing of the toothing) a further shifting of the retaining part 5 with respect to the securement part 19 is blocked.

Other form-closure connections between the securement part 19 and the retaining part 5 are also feasible, for example via bolts engaging into holes.

In the opened state of the securement device 7 the securement part 19 is retracted from the retaining part 5 and these two parts are brought out of engagement, wherein the jacket unit 2, together with the retaining part 5, is displaceable in the length adjustment direction 8.

Apart from the type of implementation of the connection between the jacket unit 2 and the retaining part 5, which will be described more precisely in the following, the elements of the steering column described above can be implemented in a manner known from prior art, in particular according to DE 10 2008 034 807 B3 cited in the introduction to the description.

The retaining part 5 is guided displaceably with respect to the jacket unit 2 parallel to the longitudinal axis 4 and is connected with the jacket unit 2, for one, across a break-away connection and, for another, across an energy absorption connection. The break-away connection can be realized, for example, via a shear bolt 27. In the depicted embodiment example, the shear bolt 27 is set, on the one hand, into an opening 28 in the retaining part 5, for example into an opening 29 (cf. FIG. 3). The jacket unit 2 comprises in this embodiment example a jacket tube 30 and a rail 31 with U-shaped cross section rigidly connected therewith, for example by welding, and extending in the direction of the longitudinal axis 4. The opening 29 is here implemented in the rail 31.

For developing the energy absorption connection serves a bending wire or strip 32, which is connected, on the one hand, with the retaining part 5, on the other hand, with the jacket unit 2. In the depicted embodiment, the bending wire or strip 32 is developed in the shape of a U, wherein the one U-leg is connected with the retaining part 5 and the other U-leg with the jacket unit 2, specifically with the rail 31. The connections of the U-legs are each such that they act in both directions parallel to the longitudinal axis 4, preferably under form closure. The two U-legs preferably extend, at least substantially, parallel to the longitudinal axis 4.

To connect the one U-leg with the retaining part 5, this part can comprise, for example, a pin 33 projecting through a slot 34 extending parallel to the longitudinal axis 4 in the rail 31 and engaging into an eyelet 35 in the bending wire or strip 32. The connection of the other U-leg with the jacket unit 2 can be developed, for example, by placing the end of the U-leg in contact on a stop 36 of the rail and through extensions 37 of the rail engaging into indentations in the U-leg.

In the embodiment, the bending wire or strip 32 is enclosed in an inner chamber of a housing formed by the rail 31 and the section of the jacket tube 30 terminating it. In this housing, the bending of the bending wire or strip 32 takes place freely, thus not about a pin.

During assembly of the steering column, the bending wire or strip is elastically deformed, e.g. it is deformed with respect to a neutral position which it assumes without external forces, wherein it exerts a reset force in the direction of the neutral position. For this purpose the bending wire or strip 32 is comprised of an adequately elastic material, for example a spring-elastic steel. Through this elastic prestress of the bending wire or strip 32, the jacket unit 2 is prestressed with respect to the retaining part 5 relative to a displacement parallel to the longitudinal axis 4 in the direction toward the motor vehicle front.

Figure 7A:
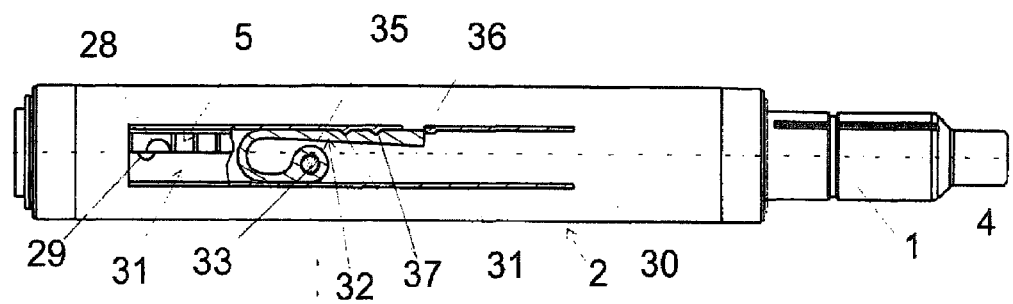
FIG. 7a is a section view along line EE of FIG. 2 during the assembly of the steering column, the parts listed in FIG. 6 being again omitted.
Figure 7B:
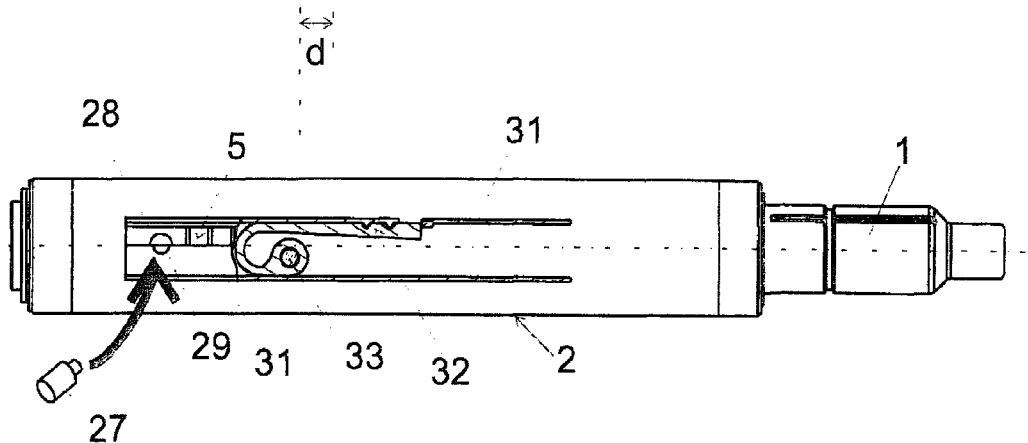
FIG. 7b is a section view analogous to FIG. 7a in the completed state of the steering column.
Figure 8:
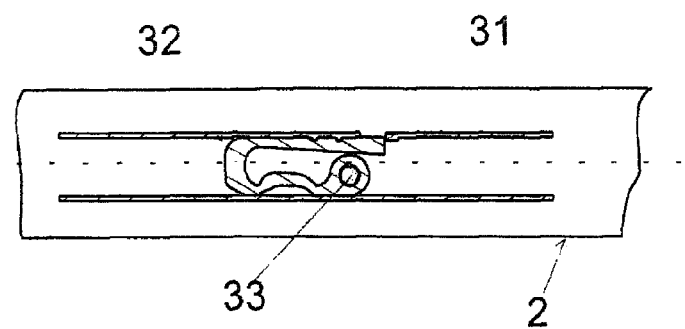
FIG. 8 is a section view analogous to FIGS. 7a and 7b after a vehicle crash.

The implementation of this prestress is depicted schematically in FIGS. 7a and 7b. In FIG. 7a, the bending wire or strip has its non-prestressed neutral position which it assumes without action of an external force, wherein it is connected with the jacket unit 2 and the retaining part 5. As indicated in FIG. 7a, in this production step the opening 28 in the retaining part 5 (shown above the longitudinal axis 4) and the opening 29 in rail 31 (shown beneath the longitudinal axis 4) are offset with respect to one another in the direction of the longitudinal axis 4.

The retaining part 5 is subsequently displaced (toward the left in FIG. 7b) with respect to the jacket unit 2 parallel to the longitudinal axis 4 by a distance d in the direction toward the vehicle front, wherein the pin 33 elastically prestresses the bending wire or strip. In this prestressed position according to FIG. 7b, the opening 28 in the retaining part 5 (shown above the longitudinal axis 4) and the opening 29 in the rail 31 (shown beneath the longitudinal axis 4) overlap one another and the shear bolt 27 is now inserted (illustrated by the arrow in FIG. 7b) whereby the break-way connection is implemented.

If in the event of a crash at least a force acting parallel to the longitudinal axis 4 in the direction toward the vehicle front is exerted onto the steering wheel-side end 3 of the steering shaft 1, in particular through the secondary collision of the driver, this force is transmitted from the steering shaft 1 onto the jacket unit 2 and is added to the prestress force exerted by bending wire or strip 32, and, if the sum of these forces exceeds a limit value, the break-away connection is released through the shearing-off or breaking-off of the shear bolt 27. Therewith, the dislocation of the jacket unit 2 parallel to the longitudinal axis 4 in the direction toward the vehicle front can commence, thus into the direction away from the steering wheel-side end 3 of the steering shaft 1, wherein the jacket unit 2 is dislocated with respect to the retaining part firmly secured by the securement part 19. After a first partial segment of this displacement path, which is preferably smaller than one tenth of the entire displacement path between the jacket unit 2 and the retaining part 5, the bending wire or strip 32 starts to counteract the further dislocation with a force as soon as the neutral position of the bending wire or strip 32 has been reached or has been exceeded. During the further dislocation, the bending wire or strip 32 is deformed with the absorption of energy, wherein this deformation, after a further segment of the displacement path which is preferably smaller than a tenth of the entire displacement path, transitions into a plastic deformation. The state after the vehicle crash in shown in FIG. 8.

For the layout of the energy absorption, in particular with respect to magnitude and course, the cross section and the cross section course of the bending strip 32 can be dimensioned appropriately. Further, essential for the energy absorption behavior are the strength of the connection between the rail 31 with the jacket unit 2 and the metal sheet thickness of the rail 31 as well as the course of the width of the slot 34 in the rail 31. Additionally, the radius of curvature of the rail 31 in the direction of the tabs, with which the rail 31 is secured on the jacket unit 2, is a parameter affecting the determination of the energy absorption behavior.

The securement device can hold the jacket unit 2, even additionally to the mounting through the engagement between the securement part 19 and the retaining part 5, for example under frictional closure, against a displacement parallel to the longitudinal axis 4, for example, so that during the closing of the securement device 7, the intermediate unit 14 is tightened against the jacket unit 2. Such an additional holding force exerted by the securement device 7 directly onto the jacket unit 2 is taken into account in the limit value of that force above which, in the event of a crash, a dislocation of the jacket unit 2 with respect to the bracket unit 6 occurs.

Figure 9:
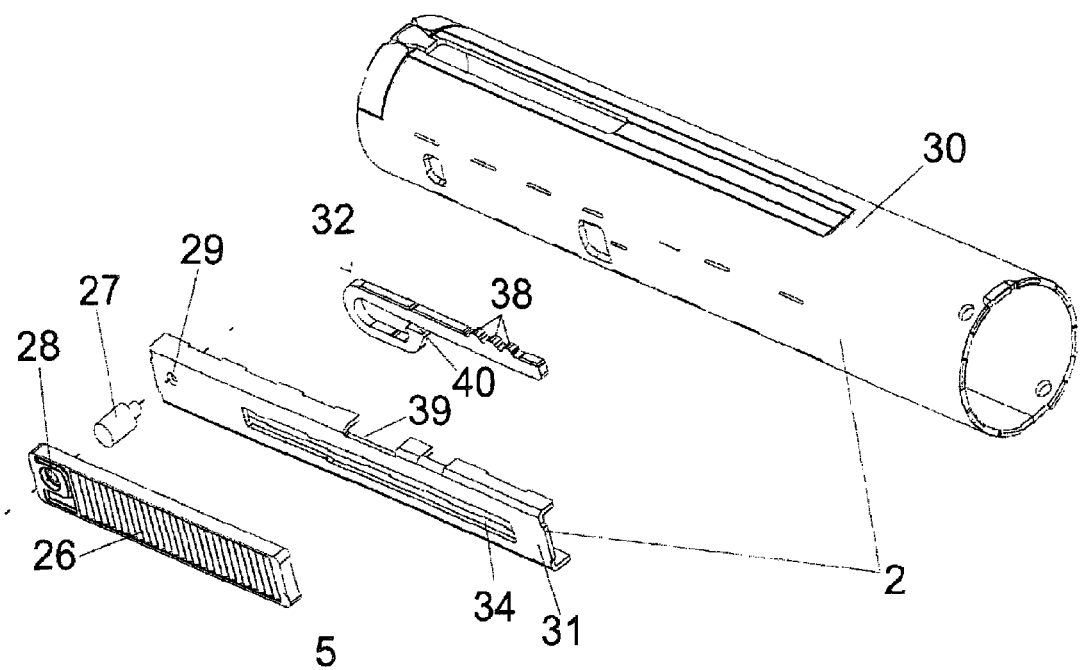
FIG. 9 is an exploded view depicting the jacket unit, of the retaining part and the connection parts connecting these according to a second embodiment of the invention.
Figure 10:
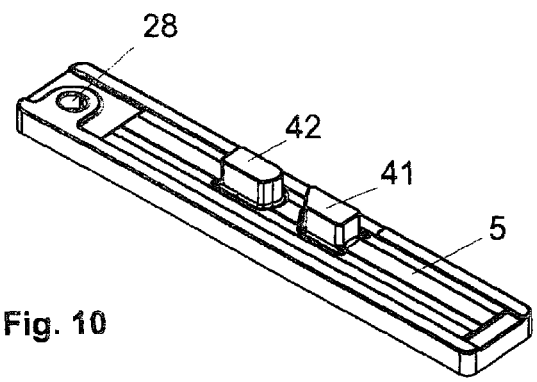
FIG. 10 is an oblique view onto the back side, not visible in FIG. 9, of the retaining part.
Figure 11A:
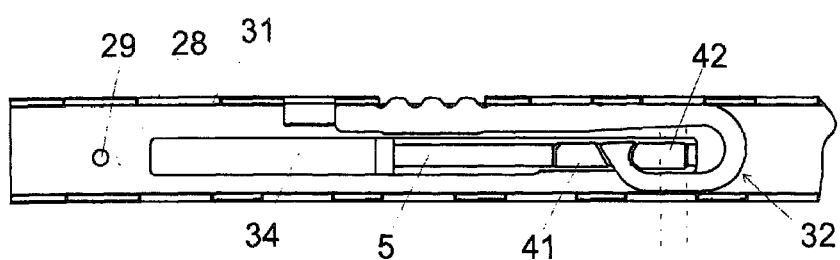
FIG. 11a is a view onto the back side, not visible in FIG. 9, of the rail of the jacket unit attached on the jacket tube in the state connected with the retaining part, in a state during the assembly of the steering column.
Figure 11B:
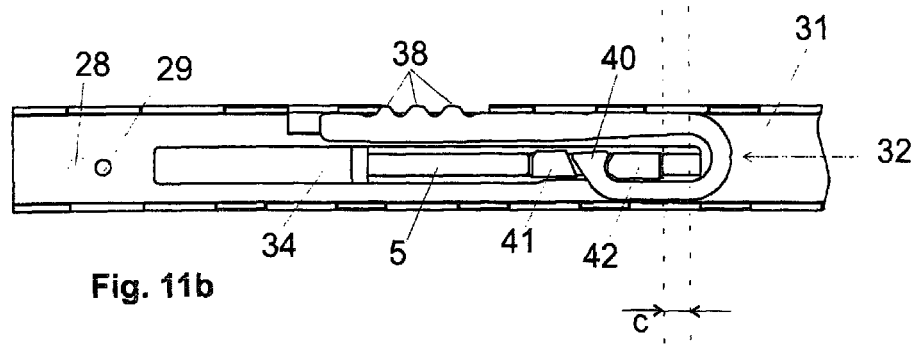
FIG. 11b is a view corresponding to FIG. 11a after a further assembly step.
Figure 11C:
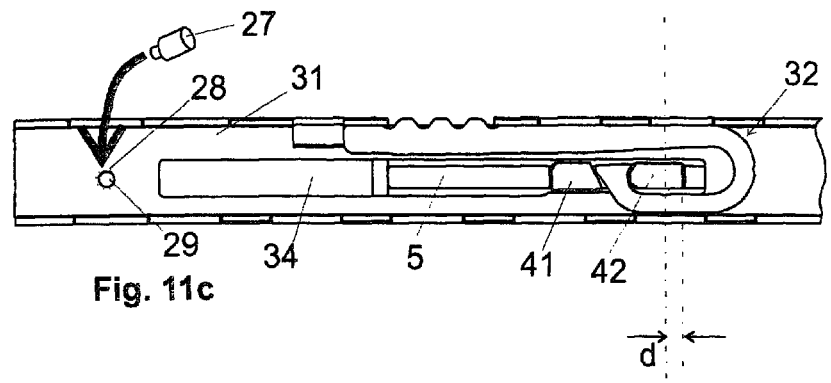
FIG. 11c is a view corresponding to FIG. 11a in the completed state of the steering column.

A second embodiment form of the invention is depicted in FIGS. 9 to 11. The distinction from the previously described embodiment lies in the energy absorption connection between the jacket unit 2 and the retaining part 5. The break-away connection is implemented by a shear bolt 27 as in the previously described embodiments.

The one U-leg of the bending wire or strip 32 is secured with the rail 31 against a displacement in both directions parallel to the longitudinal axis 4 through prominences 38 of the bending wire or strip 32, which engage into a cutout 39 of the rail 31. However, only one prominence 38 engaging into a cutout 39 could also be provided. The other U-leg includes at the end side a bend-off with a thickened end 40. This is retained in an interspace between projections 41, 42 disposed on the retaining part 5, which penetrate the slot 34 in the rail 31. This leg of the bending wire or strip is thereby held nondisplaceably in both directions of the longitudinal axis 4 with respect to the retaining part 5.

During the assembly, the unstressed bending wire or strip 32 is inserted and connected with both of its legs with the retaining part 5 and the rail 31. The retaining part 5 is subsequently first displaced parallel to the longitudinal axis 4 by a distance c in the direction away from the vehicle front, thus in the direction toward the steering wheel-side end 3 of the steering shaft 1 (toward the left in FIG. 11b), see the position evident in FIG. 11b in comparison to FIG. 11a. During this displacement, a plastic deformation of the bending wire or strip 32 occurs. Manufacturing tolerances can thereby be compensated such that in this manner a defined starting state is attained. Subsequently, there results a displacement of the retaining part 5 by a distance d parallel to the longitudinal axis 4 in the direction toward the vehicle front, thus away from the steering wheel-side end 3 of the steering shaft 1 (toward the right in FIG. 11c), wherein the bending wire or strip 32 is elastically prestressed, see FIG. 11c in comparison to FIG. 11b. In this position, the openings 28, 29 in the retaining part 5 and in the rail 31 overlap and the shear bolt 27 is inserted, which is illustrated by the arrow in FIG. 11c.

The described plastic deformation before the elastic prestress could also be carried out in the case of the first described embodiment.

In addition to the already listed advantages, the solution according to the invention has an advantageous effect on the noise behavior of the steering column. Through the prestress a dampening effect is achieved.

The break-away connection between the retaining part 5 and the jacket unit 2 could also be implemented in a manner other than in the first and second embodiment, e.g., a nose tapering the slot 34 could also be provided, over which the pin 33 or the projection 41 would need to drive for the release of the break-away connection. The break-away connection secures the jacket unit 2 with respect to the retaining part 5 and in normal operation thus prevents shaking of the jacket unit 4 with respect to the retaining part 5.

An implementation with more than one bending wire or strip 32 is also conceivable and feasible. One of the bending wires or strips or more than one of the bending wires or strips could here be elastically prestressed in the described manner. For example, on both sides of the jacket unit 2 retaining parts 5 could be provided which cooperate with securement parts, for example in the manner described in connection with the securement part 19. Both retaining parts 5 could herein be connected with the jacket unit 5 across an energy absorption connection comprising at least one bending wire or strip 32 and across a break-away connection. A connection of only one of the retaining parts with the jacket unit through an energy absorption connection or through a break-away connection is also feasible.

Although the implementation with side jaws 10, 11 of the bracket unit 6 disposed on both sides of the jacket unit 2 is preferred, against which, in the closed state of the securement device 7, parts of the securement device are tightened, implementations are also conceivable and feasible in which the bracket unit comprises only one side jaw located on one side of the jacket unit 2.

A steering column according to the invention could, for example, also be implemented such that it is adjustable only in the length adjustment direction 8. In such an embodiment, the intermediate unit 14 could be omitted and the opening 17, 18 through which penetrates clamp bolt 16 could be implemented in the shape of a circle in each side jaw 10, 11 of the bracket unit.

A steering column adjustable in the length adjustment direction 8 as well as also in the height or inclination adjustment direction 9 can also be implemented without an intermediate unit 14. Herein in the jacket unit 2 elongated holes could be provided, penetrated by clamp bolt 16, which extend in the length adjustment direction 8 of the steering column. For example, for this purpose on the jacket tube 30 at least one upwardly or downwardly projecting part could be disposed in which these elongated holes are disposed.

The jacket unit 2 can also, at least over a portion of its longitudinal extent, be implemented such that it is circumferentially open.

If, through a frictional closure connection a sufficiently high desired securement force in the direction of the length adjustment 8 between the retaining part 5 and a securement part 19 is attainable, a frictional closure engagement between these two parts could also be provided. To increase the securement force could herein also be provided additional cooperating friction faces, for example in the form of cooperating lamellae. Such cooperating lamellae could also be provided for the additional securement in the height or inclination adjustment direction 9.

As is known, the bracket unit 6 could also be connected, dislocatably in the direction parallel to the longitudinal axis 4 in the event of a crash under energy absorption, with a mounting part connected stationarily on the vehicle.

For the case that an energy absorption is required in a direction that does not coincide with the longitudinal direction of the steering column (=direction of the longitudinal axis 4), the device according to the invention can also be oriented in this direction. The prestress would in that case be introduced in this direction into the one or the several bending wires or strips 32. According to the illustrated examples, the rail 31 would be accordingly secured on the jacket unit oriented in this direction.

LEGENDS TO THE REFERENCE NUMBERS

1 Steering shaft
2 Jacket unit
3 Steering wheel-side end
4 Longitudinal axis
5 Retaining part
6 Bracket unit
7 Securement device
8 Length adjustment direction
9 Height or inclination adjustment direction
10 Side jaw
11 Side jaw
12 Side flank
13 Side flank
14 Intermediate unit
15 Swivel axis
16 Clamp bolt
17 Opening
18 Opening
19 Securement part
20 Securement part
21 Connection section
22 Section
23 Clamping lever
24 Cam disk
25 Toothing
26 Toothing
27 Shear bolt
28 Opening
29 Opening
30 Jacket tube
31 Rail
32 Bending wire or strip
33 Pin
34 Slot
35 Eyelet
36 Stop
37 Extension
38 Prominence
39 Cutout
40 End
41 Projection
42 Projection

The invention claimed is:

1. A steering column for a motor vehicle, comprising a jacket unit, supporting a steering shaft rotatably about its longitudinal axis, and a retaining part, with respect to which the jacket unit is held nondisplaceably up to a limit value of a force acting parallel to the longitudinal axis of the steering shaft in the direction toward the vehicle front onto the jacket unit, and, if the limit value is exceeded, is displaceable parallel to the longitudinal axis in the direction toward the vehicle front, wherein the jacket unit is connected with the retaining part, for one, across an energy absorption connection which comprises at least one bending wire or strip which, during a displacement of the jacket unit with respect to the retaining part parallel to the longitudinal axis in the direction toward the vehicle front, is deformed and, for another, across a break-away connection which, up to the limit value of the force is closed and blocks a displacement of the jacket unit with respect to the retaining part and, if the limit value of the force is exceeded, is released, wherein for the case, that the break-away connection is closed, between the jacket unit and the retaining part, at least one of the bending wires or strips, is elastically deformed and prestresses the jacket unit with respect to the retaining part relative to a displacement parallel to the longitudinal axis of the steering shaft in the direction toward the vehicle front.

2. The steering column as in claim 1, wherein the steering column is implemented such that it is at least length adjustable, wherein in the opened state of a securement device the jacket unit is displaceable with respect to a bracket unit supporting the jacket unit parallel to the longitudinal axis of the steering shaft and the securement device in the closed state applies a securement force for securing in position the jacket unit with respect to the bracket unit relative to a displacement parallel to the longitudinal axis.

3. The steering column as in claim 2, wherein the securement device comprises a securement part which, in the closed state of the securement device, for the application of least a portion of the securement force, is in engagement with the retaining part and, in the opened state of the securement device, is out of engagement with the retaining part and that the securement part is held with respect to the bracket unit nondisplaceably in the direction of the longitudinal axis of the steering shaft.

4. The steering column as in claim 3, wherein the securement device comprises a clamp bolt in the longitudinal direction of which the securement part during the closing and opening of the securement device is shifted for the movement into and out of engagement with the retaining part.

5. The steering column as in claim 4, wherein the bracket unit comprises side jaws, located on both sides of the jacket unit, the side jaws being penetrated by a clamp bolt of the securement device through openings and the securement part penetrates one of the side jaws of the bracket unit and/or a side flank of an intermediate unit, disposed between the side jaws of the bracket unit, and the jacket unit, through an opening, and is held by the margins of the opening of the side jaw of the bracket unit and/or by the margins of the opening of the side flank of the intermediate unit nondisplaceably in the direction of the longitudinal axis of the steering shaft.

6. The steering column as in claim 5, wherein the intermediate unit is nondisplaceable with respect to the bracket unit in the direction of the longitudinal axis of the steering shaft, the intermediate unit being swivellable in the opened state of the securement device with respect to the bracket unit about a swivel axis at right angles to the longitudinal axis of the steering shaft for a height or inclination adjustment of the steering column.

7. The steering column as in claim 5, wherein the jacket unit is guided by the bracket unit or the intermediate unit such that it is displaceable parallel to the longitudinal axis of the steering shaft.

8. The steering column as in, claim 3, wherein the retaining part and the securement part comprise cooperating toothings wherein, in the closed state of the securement device, the cooperating toothings counteract under form closure a mutual displacement in the direction of the longitudinal axis of the steering shaft.

9. The steering column as in claim 1, wherein the break-away connection between the retaining part and the jacket unit is formed by a form closure connection which, if the limit value of the force is exceeded, is released through material reforming, material shearing, or fracture.

10. A method of producing a steering column for a motor vehicle, the steering column including a jacket unit, supporting a steering column rotatably about its longitudinal axis, and a retaining part, with respect to which the jacket unit up to a limit value of a force, acting parallel to the longitudinal axis of the steering shaft in the direction toward the vehicle front onto the jacket unit, is held nondisplaceably and, if the limit value is exceeded, is displaceable parallel to the longitudinal axis in the direction toward the vehicle front, wherein the jacket unit is connected with the retaining part, for one, across an energy absorption connection which comprises at least one bending wire or strip which, upon a displacement of the jacket unit parallel to the longitudinal axis in the direction toward the vehicle front with respect to the retaining element, is deformed and, for another, across a break-away connection, which, up to the limit value of the force, is closed and blocks a displacement of the jacket unit with respect to the retaining part and, if the limit value of the force is exceeded, is released, said method comprising, before the development of the break-away connection between the retaining part and the jacket unit, prestressing at least one of the bending wires or strips through elastic deformation whereby the at least one of the bending wires or strips exerts a reset force prestressing the jacket unit with respect to the retaining part relative to a displacement parallel to the longitudinal axis of the steering shaft in the direction toward the vehicle front, and, subsequently, while maintaining the prestress of the at least one bending wire or strip, forming the break-away connection between the retaining part and the jacket unit.

11. The method as in claim 10, wherein the at least one bending wire or strip connected with the jacket unit and the retaining part is prestressed through a displacement of the retaining part with respect to the jacket unit parallel to the longitudinal axis of the steering shaft in the direction toward the vehicle front.

12. The method as in claim 11, wherein, before the prestressing of the at least one bending wire or strip, the at least one bending wire or strip is plastically deformed by displacing the retaining part with respect to the jacket unit parallel to the longitudinal axis of the retaining part in the direction away from the vehicle front.

* * * * *